UNITED STATES PATENT OFFICE.

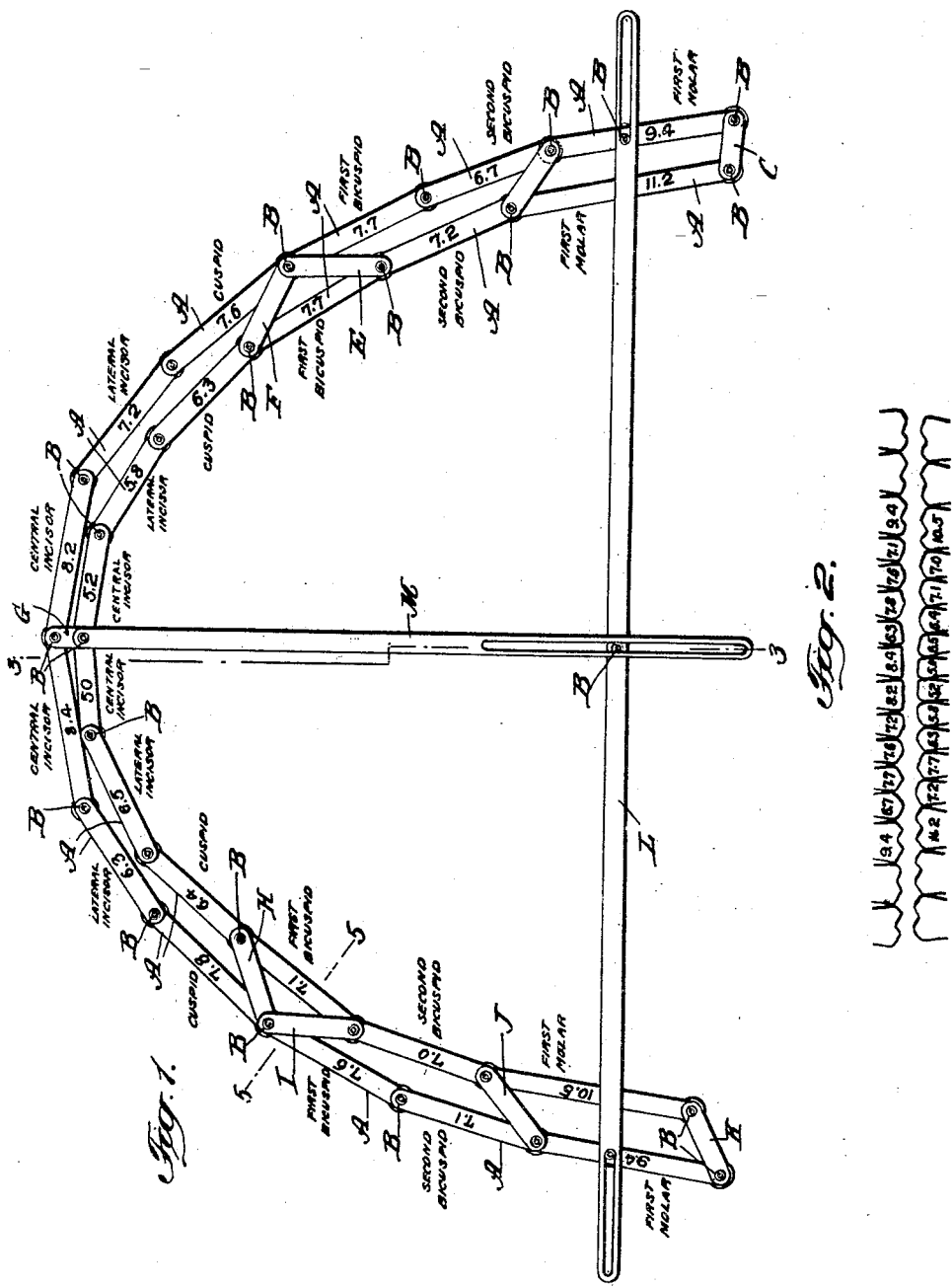

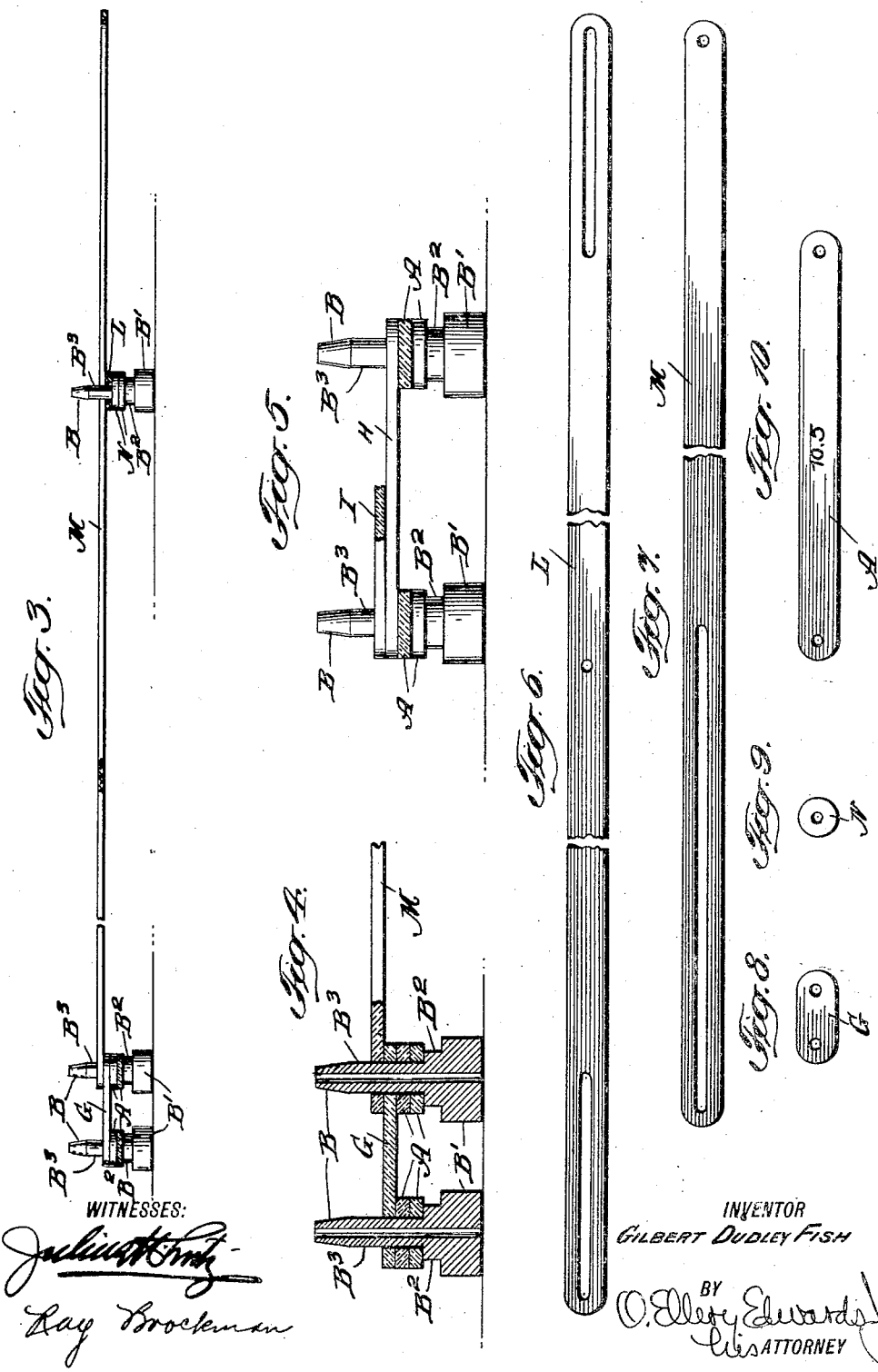

GILBERT DUDLEY FISH, OF NEW YORK, N. Y., ASSIGNOR TO FREDERICK LESTER STANTON, OF NEW YORK, N. Y.

OCCLUSOGRAPH.

1,246,408.  Specification of Letters Patent.  Patented Nov. 13, 1917.

Application filed February 4, 1916. Serial No. 76,143.

*To all whom it may concern:*

Be it known that I, GILBERT DUDLEY FISH, a citizen of the United States, and a resident of the city, county, and State of New York, have invented a new and useful Instrument for Determining the Correct Location of Teeth or Occlusograph, of which the following is a specification.

The object of my invention is to make an instrument by means of which the proper location of each tooth in each jaw, known as normal occlusion of the teeth or their natural mechanical relations, may be accurately determined regardless of the mal-positions of any or all of these teeth at the time the survey is made from which data are obtained for the construction and use of this instrument. This object is accomplished by assembling a number of links and pivots, each link connecting two pivots, and except for some cross or connecting links, each link represents between the centers of its pivots the mesio-distal diameter of a tooth, and when all links and pivots are in place on a level surface, such as a paper on a drawing board, the centers of the pivots give the points of contact of adjacent teeth when in proper relative positions and from this and other data, available from the survey, the teeth and gums of each jaw may be plotted as they are and as they should be.

A suitable instrument for making a survey is shown, described and claimed in a copending application of Rudolph L. Hanau, filed April 19th, 1915, Ser. No. 22429 for a dental surveying apparatus and another copending application, filed of even date herewith by Frederick Lester Stanton, Ser. No. 76,144, for dental charts and method of making the same shows how these instruments may be used in dental chart making.

For a more particular description of my invention, reference is to be had to the accompanying drawings, forming a part hereof, in which—

Figure 1 is a plan view of an occlusograph embodying my invention, on a reduced scale.

Fig. 2 shows development of one set of teeth for each jaw, the figures indicating in millimeters the mesio-distal diameters of the teeth and the figures attached to the links give the corresponding figures in centimeters.

Figs. 3, 4 and 5 are enlarged sectional views taken on the lines 3—3; 4—4; and 5—5 of Fig. 1, looking in the direction of the arrows, the parts being shown full size.

Fig. 6 is a full sized drawing of the cross link or chord for connecting the links representing the first molars of the upper jaw.

Fig. 7 is a similar view of a second link extending from the top of the arch to the cross link.

Fig. 8 shows a connecting link for the top of the arch, Fig. 9 a washer, and Fig. 10 a link representing a lower left molar. These last three figures are also full sized.

Throughout the various views of the drawings, similar reference characters designate similar parts.

The links A indicate various teeth, the names of which are given in Fig. 1 and these links are connected to adjacent links by pivots B and at certain points connecting links C, D, E, F, G, H, I, J and K are employed as well as the chord L and altitude link M, and where necessary to keep the links level, washers N are employed. The circular holes in each link are made true and fit snug on the pins B to which they are attached.

The links A are made of translucent celluloid and to ten times scale and accurate as to length between centers, this distance normally representing the mesio-distal diameter of the teeth as determined by measurement. When the teeth are of such a width that they cannot form a true arch, generally, the links representing the four upper incisors are removed and a true arch made without them but so made that when a true arch is formed, the new links, which are substituted, are, in each instance, a little longer between centers than the removed links. Links as near as possible to the removed links are used in order to create as little space between the teeth as possible and give the nearest approach to normality. In some instances links other than upper incisor links must be removed and then either longer or shorter links substituted, which will enable an approximate arch to be formed. If the removed links are too long, the abnormal tooth must be twisted or reduced to allow approximate occlusion. If too short, a corresponding space must be allowed. If a tooth is missing, a link A has to be used as a substitute for the missing tooth and made to correspond to the same tooth on the opposite side of the mouth.

The pivots B have bases $B^1$, collars $B^2$ on which the links A rest, or washer N, as the case may be, and shanks $B^3$ which enter the perforations in the links and washers. Each pivot B is perforated along its axis to allow the insertion of a pin or other marking means which may be used to mark with accuracy, ease and certainty the center of each pivot B after the arch shall have been determined in the manner described below.

It will be noted that the links and pivots B are arranged in two curved rows, an outer and an inner and that these rows are connected by links C to K inclusive. The outer row represents upper teeth and the inner row represents lower teeth. The length of each connecting link between centers is determined as follows.

Links C, D, J and K are made so as to hold the links A in proper relation and their lengths are determined by taking two diagrams, one of each lower tooth on stiff paper and one of each corresponding upper tooth on translucent paper or tracing paper or linen. These diagrams are shifted in each instance until each upper tooth is in proper position with regard to its lower tooth. Then the distances between points are measured and these links C, D, J and K are made accordingly. If these diagrams are made to the same scale as the links, which is the preferred way, the link length may be taken directly from the diagrams. To keep the molar links A in proper relation it may be necessary to add a diagonal link at each pair, or at one pair. Such a link is omitted to simplify the drawings.

The lengths of links E, F, H and I are determined as follows. A line is laid off representing the length of the first bicuspid at the right of the lower jaw. A perpendicular is erected at the center thereof and extended until its length equals one half the distance between the outer and inner cusps of the upper second bicuspid. The measurements are taken from a casting of the teeth and enlarged to the scale of the links. This is because normally the outer cusp of the lower first bicuspid occludes between the upper first bicuspid and cuspid and bucco-lingually between the outer and inner cusp of the upper first bicuspid. The length of the links E and F is the length of a line from the end of this perpendicular to the end of this line. In a similar way the lengths of the links H and I are determined.

The length of the link G is determined by measuring the thickness of the upper and lower central incisors at one side and then taking the average and enlarging this dimension, so determined, to the scale of the apparatus. If the normal over bite of the teeth cannot be had, this link G must be lengthened or shortened to permit of the best occlusal relations of the teeth.

At points representing the buccal grooves of the first upper molars are placed in the links A, pivots B, the distance between which represents about 52 millimeters so that the slots at the ends of the chord L are long enough to allow these pins to be placed about 52 centimeters apart. These slots are each five centimeters long to allow for a variation of ten millimeters in the width of the arch. Another pin B is placed at the center of the chord L and it also passes through a slot in the altitude link M. The other end of the altitude link M is placed over one end of the link G and over the inner pivot B, as shown. The slot in this altitude link M is 13 centimeters long to provide for a depth of arch varying from 21 to 34 millimeters.

When the apparatus has been made and assembled as above described, it is placed on cross section paper which has been stretched on a drawing board or other smooth surface and this cross section paper is preferably made on a millimeter or centimeter scale to correspond with the apparatus. The altitude link M is placed in proper relation to the chord L and then the links A are slid over the cross section paper until in proper position, that is, the arch must be smooth and symmetrical with respect to the altitude link M and the chord L at right angles thereto. The arch must be smooth and free from buckles, and the links of the respective jaws are placed in their correct occlusal relations. If they cannot assume this position, the links, causing the disturbance, are removed and suitable links substituted and the arch manipulated and made smooth. For teeth of given dimensions the arch can at best be made smooth only in one position and this indicates the correct, occlusal positions of the teeth in their respective jaws. The positions being thus determined with absolute accuracy, the proper occlusal relations of teeth are indicated by pin pricks made through the perforations in the pivots B as above described. Of course, if different links have been substituated for abnormal teeth, allowance must be made accordingly when drafting the charts. In any event, the true arch for a given set of teeth is always found, and if the chart is properly made from these points, fixed as above described, it must be correct and it is the only possible correct chart which shows the teeth as they must be to be in occlusion. Any departure from this charted position is malocclusion. By charting the teeth as they are and as they ought to be on a sheet of paper or tracing linen, it is possible to show by charts just what minimum changes must be made in each tooth to put it in proper position. Corresponding charts, from the data above given, can be easily made for the gums which will show them as they are and as they ought to be.

While I have shown and described one embodiment of my invention, it is obvious that it is not restricted thereto, but is broad enough to cover all constructions which come within the scope of the annexed claims.

What I claim is:

1. In a device of the class described, means for locating the proper occlusal positions of the teeth of a human being, said means having two connected rows of interconnected relatively movable parts, each part corresponding by scale dimensions to the mesio distal diameter of a tooth and arranged in proper order corresponding to the order in which the teeth appear.

2. In a device of the class described, articulated means for locating the proper occlusal positions of the teeth of a human being, said means having two connected rows of interconnected relatively movable parts, each part corresponding by scale dimensions to the mesio distal diameter of a tooth and arranged in proper order corresponding to the order in which the teeth appear.

3. In a device of the class described means containing links and pivots for locating the proper occlusal positions of the teeth of a human being, said means having two connected rows of interconnected relatively movable parts, each part corresponding by scale dimensions to the mesio distal diameter of a tooth, and arranged in proper order corresponding to the order in which the teeth appear.

4. In a device of the class described, two related and interconnected rows of articulated links for locating the proper occlusal positions of the teeth of a human being, each link corresponding by scale dimensions to the mesio distal diameter of a tooth, and arranged in proper order corresponding to the order in which the teeth appear.

5. In a device of the class described, translucent articulated means for locating the proper occlusal positions of the teeth of a human being, said means having two connected rows of interconnected relatively movable parts, each part corresponding by scale dimensions to the mesio distal diameter of a tooth and arranged in proper order corresponding to the order in which the teeth appear.

6. In a device of the class described, articulated links respectively of lengths having a given ratio to the mesio-distal diameters of the teeth of a human being and having a relative arrangement corresponding with that of the teeth to which they respectively correspond for locating the proper occlusal positions of such teeth.

7. In a device of the class described, articulated means for locating the proper occlusal positions of the teeth of a human being; said means containing two sets of articulated links, each link being proportioned in length to the mesio-distal diameter of a tooth and having a relative arrangement corresponding with that of the teeth to which they respectively correspond, said links being arranged in two rows, an outer and the inner, and connecting links for holding parts of said rows in fixed relative position.

8. In a device of the class described, means for locating the proper occlusal positions of the teeth of a human being, said means including in its construction an outer and an inner row of articulated links and having a relative arrangement corresponding with that of the teeth to which they respectively correspond, the inner row representing lower teeth and the outer row representing upper teeth, and links connecting the pivots at the end of the first bi-cuspid links of the lower jaw, with the pivot between the adjacent cuspid and first bi-cuspid links of the upper jaw.

9. In a device of the class described, means for locating the proper occlusal positions of the teeth of a human being, said means including articulated links and having a relative arrangement corresponding with that of the teeth to which they respectively correspond, each link representing a tooth and a chord with slotted ends connecting the upper first molar links.

10. In a device of the class described, means for locating the proper occlusal positions of the teeth of a human being, parts of said means representing first molar teeth and parts representing central incisor teeth, a chord connecting said first molar teeth and an altitude link connecting said chord with said central incisor teeth.

11. In a device of the class described, a series of links representing teeth and perforated pivots connecting said links.

12. In a device of the class described, a number of perforated pivots in a number of links connecting said pivots and each link being perforated to represent between centers the mesio-distal diameter of a tooth and having a relative arrangement corresponding with that of the teeth to which they respectively correspond, said links being arranged in two rows, an outer representing upper teeth, and an inner representing lower teeth, links connecting said rows, and a chord link and an altitude link, the former connecting links corresponding to molar teeth and the latter connecting links corresponding to central incisor teeth with said chord.

13. In a device of the class described, means for locating the proper occlusal positions of the teeth of a human being, said means consisting of a flexible mechanical member which is spaced to correspond to the mesio-distal diameters of the teeth and having a relative arrangement corresponding with that of the teeth to which they respectively correspond.

14. In a device of the class described, means for locating the proper occlusal positions of the teeth of a human being, said means consisting of an articulated link work, the links corresponding in length to the mesio-distal diameters of the teeth and having a relative arrangement corresponding with that of the teeth to which they respectively correspond.

15. The method of making a chart of teeth in their proper occlusal positions, which consists in placing the mesio-distal diameters on a flexible mechanical instrument and then bending said instrument to form an arch suitable for the particular teeth under consideration, and then plotting said diameters in the same relative position in which they appear in said instrument.

16. The method of making charts showing teeth in their proper occlusal positions, which consists in making a flexible mechanical instrument with articulated links, each link corresponding with the mesio-distal diameter of a tooth, and then bending said instrument to form an arch suitable for the teeth, and then plotting said diameters in the same relative position in which they stand in said instrument.

17. The method of making dental charts showing teeth in occlusion, which consists in measuring the mesio-distal diameters of said teeth, then making links to scale ten times the natural size, then articulating said links and forming a mechanical instrument, and then bending said instrument so as to show the teeth in their proper occlusal positions, and then plotting such positions on a piece of paper and finally copying the same to actual size whereby a chart is made showing the teeth in their proper occlusal relations.

GILBERT DUDLEY FISH.

Copies of this patent may be obtained for five cents each, by addressing the "Commissioner of Patents, Washington, D. C."